United States Patent [19]

Corley et al.

[11] Patent Number: 4,791,154
[45] Date of Patent: Dec. 13, 1988

[54] EPOXY RESIN COMPOSITION

[75] Inventors: Larry S. Corley, Houston; Donald R. Gehring, Fort Worth, both of Tex.

[73] Assignee: Shell Oil Company, Houston, Tex.

[21] Appl. No.: 126,534

[22] Filed: Nov. 30, 1987

[51] Int. Cl.$^4$ .............................................. C08G 59/50
[52] U.S. Cl. ....................................... 523/456; 528/94; 528/123; 528/365; 528/393; 528/407
[58] Field of Search ................. 528/123, 407, 94, 365, 528/393; 523/456

[56] References Cited

U.S. PATENT DOCUMENTS

| | | | |
|---|---|---|---|
| 2,831,820 | 4/1958 | Aase et al. | 260/2.5 |
| 3,282,863 | 11/1966 | Carey et al. | 260/2.5 |
| 3,383,360 | 5/1968 | Harrison | 260/47 |
| 3,467,707 | 9/1969 | Aelony | 528/123 X |
| 3,759,914 | 9/1973 | Simms et al. | 260/37 EP |
| 3,909,497 | 9/1975 | Hendry et al. | 260/77.5 A |
| 3,975,346 | 8/1976 | Bosso et al. | 260/29.2 EP |
| 3,983,092 | 9/1976 | Bateman et al. | 260/47 EN |
| 4,305,861 | 12/1981 | Marx et al. | 260/31.6 |
| 4,579,931 | 4/1986 | Corley | 528/90 |
| 4,581,436 | 4/1986 | Corley | 528/90 |
| 4,595,648 | 6/1986 | Stanton et al. | 430/162 |
| 4,595,761 | 6/1986 | Chattha | 546/26.3 |
| 4,611,046 | 9/1986 | Chattha | 528/98 |
| 4,675,374 | 6/1987 | Nichols | 528/119 |

*Primary Examiner*—Earl Nielsen

[57] ABSTRACT

A composition comprising an epoxy resin and an aromatic azopolyamine curing agent is described. The use of azopolyamine curing agents in reactive monomer-diluted systems results in a high-modulus cured epoxy system.

22 Claims, No Drawings

EPOXY RESIN COMPOSITION

BACKGROUND OF THE INVENTION

This invention relates to epoxy resin compositions. In one aspect, the invention relates to high-modulus epoxy compositions suitable for use in advanced composites.

It is known that aromatic diamines and polyamines are useful curing agents for epoxy resin compositions in which high heat resistance, good elongation and relatively long pot life are desired. These properties are often retained or enhanced in the presence of small amounts of a viscosity-reducing styrenic monomer diluent and a crosslinking codiluent such as trimethylolpropane timethacrylate. However, in many cases, aromatic amine-cured epoxies have lower modulus than would be desired, especially for use as the matrix phase in advanced composites. This is particularly true of glycidyl ethers of bisphenols (such as the diglycidyl ether of bisphenol-A) cured with orthoalkylated aromatic diamines such as diethyltoluenediamine (DETDA). Such orthoalkylated aromatic diamines have become popular because of claims of reduced toxicity in comparison with non-orthoalkylated aromatic diamines or polyamines, such as methylenedianiline (MDA). However, the problem of low modulus can become severe in diepoxy resins cured with some of the orthoalkylated aromatic diamines, especially DETDA.

A number of methods exist in the art for raising the modulus of a cured epoxy resin. One of these is to add a multfunctional resin (such as N,N,N',N'-tetraglycidyl methylenedianiline, or a glycidated phenol or o-cresol novolac) to the system to replace part or all of the diglycidyl bisphenol. This method can raise the modulus very effectively. However, the increase in crosslink density produced by the multifunctional resin often lowers the tensile elongation of the cured epoxy to 2% or less. Another method of increasing the cured epoxy modulus involves adding antiplasticizers or "fortifiers" such as the adduct of phenyl glycidyl ether with p-hydroxyacetanilide. These materials are typically unreactive but may contain some reactive epoxy groups. The "fortifiers" are claimed to increase cured epoxy modulus by filling much of the free volume in the cured epoxy network. However, the use of these antiplasticizers or "fortifiers" has a number of disadvantages. For example, the fortifiers, especially the unreactive ones, tend to reduce both the heat resistance and the break elongation of the cured epoxy. These effects become more pronounced as the fortifier concentration is increased to raise the modulus further. The reactive fortifiers, which contain some epoxy or epoxy-reactive groups, cause less loss in heat resistance and tensile elongation. However, the reactive fortifiers are also less effective than the unreactive ones in raising the modulus.

Other methods of raising the modulus of an amine-cured epoxy resin include undercuring the resin and the use of an excess of resin with respect to curing agent. The first is undesirable because the heat resistance is lowered with respect to the fully cured network. The second is associated with both lowered heat resistance and lowered tensile elongation. Simple alicyclic anhydrides, such as methyl tetrahydrophthalic anhydride, yield cured epoxy resins which are much higher in modulus than typical aromatic amine-cured epoxies and also have good tensile elongation (in the 6–8% range). However, these anhydrides yield cured networks which are considerably lower in $T_g$ or HDT than standard aromatic-amine cured epoxies. The anhydride-cured networks are also held together by hydrolytically sensitive ester linkages.

It is therefore an object of the invention to increase the modulus of an aromatic amine-cured epoxy network. In one aspect, it is an object of the invention to prepare an epoxy resin composition which, in the cured state, has a combination of high modulus, good heat resistance and high tensile elongation.

SUMMARY OF THE INVENTION

According to the invention, a composition is provided comprising an epoxy resin and an aromatic azopolyamine curing agent. The aromatic azopolyamine curing agent can be, for example, the reaction product of an arenediazonium salt with an aromatic diamine. In a preferred embodiment, the composition further contains at least one reactive monomer diluent and a crosslinking agent for the monomer diluent.

DETAILED DESCRIPTION OF THE INVENTION

The invention composition includes an epoxy resin. The epoxy resin component of the composition can be any curable resin having, on the average, more than one vicinal epoxide group per molecule. The epoxy resin can be saturated or unsaturated, aliphatic, cycloaliphatic, aromatic or heterocyclic, and may bear substituents which do not materially interfere with the curing reaction. They may be monomeric or polymeric.

Suitable epoxy resins include glycidyl ethers prepared by the reaction of epichlorohydrin with a compound containing at least one hydroxyl group carried out under alkaline reaction conditions. The epoxy resin products obtained when the hydroxyl group-containing compound is bisphenol-A are represented below by structure I wherein n is zero or a number greater than 0, commonly in the range of 0 to 10, preferably in the range of 0 to 2.

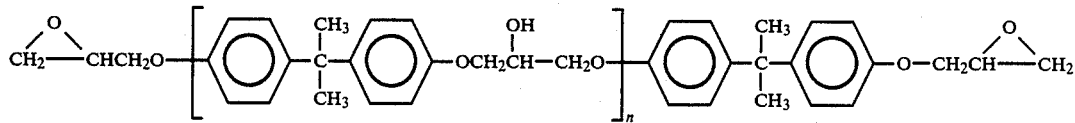

Other suitable epoxy resins can be prepared by the reaction of epichlorohydrin with mononuclear di- and trihydroxy phenolic compounds such as resorcinol and phloroglucinol, selected polynuclear polyhydroxy phenolic compounds such as bis(p-hydroxyphenyl)methane and 4,4'-dihydroxybiphenyl, or aliphatic polyols such as 1,4-butanediol and glycerol.

Epoxy resins suitable for the invention compositions have molecular weights generally within the range of 50 to about 10,000, preferably about 200 to about 1500. The commercially-available epoxy resin EPON ® Resin 828, a reaction product of epichlorohydrin and 2,2-bis(4-hydroxyphenyl)propane (bisphenol-A) having a molecular weight of about 400, an epoxide equivalent (ASTM D-1652) of about 185-192, and an n value (from formula I above) of about 0.2, is presently the preferred epoxy resin because of its low viscosity and commercial availability.

The invention composition includes an aromatic azopolyamine curing agent. By "aromatic azopolyamine" is meant a compound having more than one amine group attached directly to one or more aromatic rings and one or more azo (—N=N—) groups. The azopolyamine curing agent is preferably a compound according to the formula

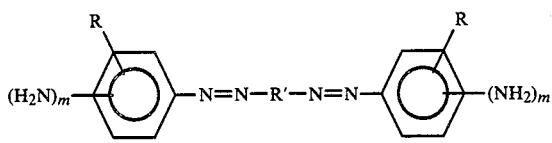

in which each R is selected independently from H and $C_1$–$C_4$ alkyl; R' is a substituted or unsubstituted aromatic or bisaromatic group; and m is 1 or 2. Such compounds are generally the reaction products of an arenediazonium salt with an aromatic diamine, and include a large number of compounds known in the art of azo dyes. Particularly suitable among such azo compounds are Bismarck Brown R base (C.I. Solvent Brown 12 or C.I. 21010B) and Bismarck Brown Y base. These materials can be prepared by tetrazotizing an acid solution of one equivalent of 2,4-toluenediamine or m-phenylenediamine, respectively, and then adding two equivalents of the same amine as a coupler. The (idealized) structure of a major component of each dye is as follows:

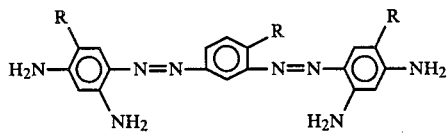

in which R is $CH_3$ and H, respectively.

The epoxy resin and azopolyamine curing agent can be combined by mixing the curing agent as a powder into a liquid epoxy resin or melt-blended into a liquid-form epoxy resin at elevated temperature. However, melt blending is not preferred because of the high melting point of the unmodified dye and the tendency for extensive cure to occur before the dye is fully dissolved in the resin. Mixing can also be carried out by dissolving the azopolyamine curing agent at elevated temperature below the melting point in a liquid aromatic or aliphatic diamine or polyamine to make a mixture which is a viscous liquid at room temperature or a low melting solid. This mixture may optionally contain a nonreactive solvent such as isopropyl alcohol or a reactive monomer diluent such as trimethylolpropane trimethacrylate. The mixture can then be mixed with the epoxy resin to form a resin/curing agent mixture which can be cured.

Curing of the epoxy/curing agent system is carried out by heating the system to a temperature over about 80° C., preferably over about 120° C., for a time effective to harden the resin, generally at least 1 hour, and preferably at least 2 hours. The cure can be carried out in a staged cycle, as illustrated in Example 1.

The composition can, if desired, contain a second curing agent. Suitable co-curing agents include aliphatic amines such as 1,2-diaminocyclohexane; non azo group-containing aromatic amines such as 2,4-bis(p-aminobenzyl)aniline, diethyltoluenediamine and methylenedianiline; cyclic anhydrides such as trimellitic anhydride; imidazoles such as 2-ethyl-4-methylimidazole; and cationic curing agents such as boron trifluoride complexes. The preferred curing agents for use with the azopolyamines are aromatic amines, most preferably diethyltoluenediamine.

The curing agent will be present in the composition in an amount effective for curing the epoxy resin. Generally, the curing agents will be present in an amount of from about 0.5 to about 2.0 chemical equivalents of amine to epoxy resin, preferably from about 0.60 to about 1.5 equivalents for each equivalent of epoxy resin, although this amount can vary depending upon the particular curing agent and the conditions of cure. When a mixture of curing agents is used, the azopolyamine will generally constitute at least about 10 weight percent of the mixture, with the amount used depending on the cure properties desired as well as the solubility characteristics of the azopolyamine. For example, Bismarck Brown azopolyamines are generally employed, for greatest handling convenience, in diethyltoluenediamine solution in about a 30:70 azopolyamine:DETDA weight ratio diluted with a reactive monomer.

The invention composition can optionally contain a reactive diluent. The reactive diluent is generally an aliphatic or aromatic monomer having at least one site of vinyl unsaturation. Examples of unsaturated aromatic monomers include, for example, styrene, α-methyl styrene, p-methyl styrene, halo- and nitro-substituted styrenes such as vinyl toluene, chlorostyrene, bromostyrene, nitrostyrene, divinylbenzene, tert-butylstyrene, 2-vinylpyridine, and vinylnaphthalene. Styrene is the preferred vinyl aromatic monomer.

The reactive diluent can be an ester or amide of an ethylenically unsaturated carboxylic acid such as acrylic acid, methacrylic acid, crotonic acid, α-phenylacrylic acid, α-cyclohexylacrylic acid, maleic acid, cyanoacrylic acid and methoxyacrylic acid. Examples of esters of these include methyl methacrylate, ethyl acrylate, butyl acrylate, butyl methacrylate, isobutyl methacrylate, 2,3-dibromopropyl acrylate and pentachlorophenyl methacrylate.

Also included in the reactive diluents are polyacrylate and polymethacrylate esters of polyols containing more than one terminal acrylate or methacrylate group, such as acrylates and methacrylates of alkylene glycols, polyoxyalkylene glycols, alicyclic glycols, and higher glycols, such as, for example, ethylene glycol, triethylene glycol, tetraethylene glycol, tetramethylene glycol, hexanediol, trimethylolethane, trimethylolpropane and pentaerythritol. Typical such unsaturated monomers include trimethylolpropane triacrylate, trimethylolethane triacrylate, trimethylolpropane trimethacrylate, trimethylolethane trimethacrylate, tetramethylene glycol dimethacrylate, ethylene glycol dimethacrylate, triethylene glycol dimethacrylate and 1,6-hexanediol diacrylate. Preferred esters are neopentyl glycol dimethacrylate, trimethylolpropane trimethacrylate, trimethylolpropane triacrylate, pentaerythritol triacrylate and 1,3-butylene dimethacrylate.

Examples of unsaturated carboxylic acid amides include acrylamide, N,N'-dimethylacrylamide, diacetone acrylamide, N-isopropylacrylamide and N,N'-dimethyl methacrylamide. The reactive diluent can be a cyano-containing compound such as acrylonitrile, methacrylonitrile and halogenated acrylonitriles. The reactive diluent can be a vinyl ester or amide such as vinyl acetate, vinyl benzoate, divinyl adipate and N-vinylpyrrolidone. The reactive diluent can be an allyl-containing monomer such as diallyl phthalate, triallyl isocyanurate, diallyl isophthalate and allyl diglycol carbonate.

The reactive diluent can also be a mixture of one or more of the above monomers. A mixture of a vinyl aromatic monomer, such as styrene, and a multifunctional methacrylate, such as trimethylolpropane trimethacrylate (TMPTMA), is preferred.

The reactive diluent will generally be present in the composition in an amount effective to reduce the viscosity of the composition to the desired level. Generally, the reactive diluent will be present in an amount of about 1 to about 75 weight percent, preferably about 3 to about 25 weight percent, based on the weight of the composition.

The invention composition optionally includes a free radical initiator present in an amount effective to crosslink the reactive diluent. Examples of such initiators include the peroxides such as benzoyl peroxide, tert-butyl hydroperoxide, ditert-butyl peroxide, hydrogen peroxide, potassium peroxydisulfate, bis(methyl cyclohexyl)peroxide, cumene hydroperoxide, acetyl benzoyl peroxide and dicumyl peroxide; and azo compounds such as 2,2'-azobisisobutyronitrile, dimethyl 2,2'-azobisisobutyrate, 2,2'-azobis(2,4-dimethylvaleronitrile) and 2,2'azobisisobutyramide. A preferred initiator is 2,5-dimethyl-2,5-bis(tertiary butylperoxy)hexane. The amount of the free radical initiator can vary over a wide range depending upon the type and amount of vinyl monomer present, the type of initiator and desired end properties. In general terms, the amount of the free radical initiator will, for most purposes, fall within the range of about 0.001 to about 10 weight percent, preferably about 0.01 to about 5 weight percent, based on the weight of the composition.

The invention composition optionally includes a curing accelerator present in an amount effective to increase the rate of cure of the epoxy resin. Suitable curing accelerators include carboxylic acids such as acetic acid, benzoic acid and salicylic acid; phenolic compounds such as phenol, p-nitrophenol, 2,4-dinitrophenol, 2,4-dichlorophenol, bisphenol-A, o-cresol, resorcinol and oligomeric condensates of phenolic compounds with aldehydes or ketones; imidazoles such as imidazole, 2-methylimidazole, 2-ethyl-4-methylimidazole and 1-benzyl-2-methylimidazole; borate esters such as trimethyl borate, tricresyl borate, and trimethoxyboroxine; metal complexes and salts such as stannous octoate, aluminum triisopropoxide, zinc acetylacetonate and di(sec-butoxy)aluminum ethyl acetoacetate complex; strong acids such as sulfuric and p-toluenesulfonic acid; sulfonium salts of anions of low nucleophilicity such as tetrafluoroborate; and boron trifluoride complexes. The amount of accelerator present can vary widely but will generally be within the range of about 0.001 to about 10 weight percent, preferably about 0.01 to about 5 weight percent, based on the weight of the composition.

The monomers will usually contain an amount of a polymerization inhibitor effective to prevent premature polymerization of the monomer, generally less than about 0.5 weight percent, usually less than about 0.2 weight percent, based on the weight of the monomer.

Examples of suitable inhibitors include tertiary butyl catechol, benzoquinone, hydroquinone and phenothiazine.

The invention compositions are useful as sheet molding compositions, in structural applications such as automobile parts, coatings and electrical laminates. The composition is suitable for fiber-reinforced composites appications, for which a fibrous reinforcing material, such as chopped glass, glass fibers, carbon fiber, and the like, in the form of a mat, cloth or continuous fibers, for example, is impregnated with the epoxy resin system. The impregnated fibers are usually subjected to a relatively mild heat treatment ("B-staged") to partially cure the resin to a flexible, tacky state, or "prepreg." The prepreg is then subjected to elevated temperature and pressure so as to completly cure the resin to a hard, inflexible state. A plurality of prepregs can be layered and cured to form a laminate having utility in circuit boards and other electrical applications.

EXAMPLE 1

This comparative example illustrates the preparation of cast resin specimens with a mixture of epoxy resin, diethyltoluenediamine (DETDA), styrene, and TMPTMA in the absence of an azo-functional amine co-curing agent. A resin mixture was prepared from 100 parts of EPON ® Resin 828, 8 parts of styrene (containing 1000 ppm phenothiazine as inhibitor), and 0.4 part of Lupersol 101 (2,5-bis(t-butylperoxy)-2,5-dimethylhexane). A curing agent mixture was prepared from 32 parts of DETDA and 8 parts of TMPTMA (also containing 1000 ppm phenothiazine as inhibitor). The resin and curing agent mixtures were combined in different weight ratios (to cover a range of amine hydrogen/epoxy group ratio) as shown in Table 1. The mixtures were combined in polypropylene beakers, mixed thoroughly with Jiffy mixers, and degassed under vacuum.

A portion of each mixture was poured into a mold made of two glass plates held ⅛" (3.2 mm) apart with a polytetrafluoroethylene spacer to make a sheet casting. Still another portion of some of the mixtures was poured into two aluminum molds containing a linear cavity ½" (12.7 mm) square to form bar castings. The sheet and bar molds were placed in an oven and held for the cure cycle indicated in Table 1. The sheet and bar castings were then removed from the molds and tested for mechanical and flammability properties. Mechanical properties are given in Table 1. One can see from Table 1 that the tensile modulus of most of the systems was in the range of 2.5 GPa or below. The two systems made with the highest ratios of curing agent to resin were somewhat higher in modulus, in the 3 GPa range. However, they had heat distortion temperature (HDT) values of below 110° C.

EXAMPLE 2

This example illustrates the preparation of cast resin specimens with a curing agent mixture containing Bismarck Brown R Base (BBRB). A resin mixture was prepared from 100 parts of EPON ® Resin 828, 15 parts of styrene (which contained 1000 ppm phenothiazine as inhibitor), 5 parts of TMPTMA (which also contained 1000 ppm phenothiazine as inhibitor), and 0.4 part of Lupersol 101. A curing agent mixture was prepared by mixing 30 parts of BBRB powder and 70 parts of liquid DETDA, heating to 120° C., stirring until the BBRB powder was dissolved, cooling to 80° C., adding 17.6 parts of TMPTMA (which also contained 1000 ppm phenothiazine as inhibitor), and stirring until homogeneous. (The reason for the use of higher total monomer levels in Example 2 than in Example 1 was to maintain the viscosity of the systems near 1 Pa.s (1000 cp) for ease of processability.) The resin and curing agent mixtures were combined and cured into casting as in Example 1. Mechanical properties of the castings are given in Table 2.

One can see from Table 2 that most of the castings made from the curing agent mixture containing BBRB had a tensile modulus of 3 GPa or higher. Tensile elongation was respectable, exceeding 4% for most of the castings, far above the 2.5% characteristic of many types of high-modulus epoxy systems. Heat distortion temperature (HDT) was above 140° C. for all but one of the castings, putting them almost in the HDT range of the approximately stoichiometric mixture in Example 1 and far above the HDT of the higher-modulus resin systems in Example 1.

EXAMPLE 3

This example illustrates the effectiveness of an aromatic azopolyamine, in the absence of other curing agents, to cure an epoxy resin. The resin mixture from Example 2 (150 grams) was mixed with 75 grams of Bismarck Brown R Base powder with a Jiffy mixer. A 2.25 gram amount of a sulfonium salt mixture (prepared by condensing 2-(ethylthio)ethanol with $HBF_4$ as in Example 4 of U.S. Pat. No. 4,554,342) was added as a cure accelerator. The mixture was mixed with a Jiffy mixer but not degassed. A mold made of two glass plates as in Example 1 was preheated to 68° C. and the mixture was poured into the mold. The mold was placed in an oven for 2 hours to cure. Differential scanning calorimetry (DSC) on the cured material did not show an evident glass transition below 300° C.

TABLE 1

EFFECT OF RESIN/CURING AGENT RATIO ON CURED PROPERTIES OF MONOMER-MODIFIED EPON ® RESIN 828 CURED WITH DIETHYLTOLUENEDIAMINE (DETDA)

| Mixture # | 1 | 2 | 3 | 4 | 5 | 6 |
|---|---|---|---|---|---|---|
| Composition as mixed: | | | | | | |
| Epon resin 828 mixture[a], parts | 100 | 100 | 100 | 100 | 100 | 100 |
| DETDA mixture[b], parts | 28 | 31 | 34 | 37 | 41 | 45 |
| Composition breakdown: | | | | | | |
| EPON resin 828, parts | 100 | 100 | 100 | 100 | 100 | 100 |
| DETDA, parts | 24.3 | 26.9 | 29.5 | 32.1 | 35.5 | 39.0 |
| Styrene[c], parts | 8 | 8 | 8 | 8 | 8 | 8 |
| TMPTMA[c], parts (trimethylolpropane trimethacrylate) | 6.1 | 6.7 | 7.4 | 8.0 | 8.9 | 9.8 |
| Lupersol 101[d], parts | 0.4 | 0.4 | 0.4 | 0.4 | 0.4 | 0.4 |
| NH/epoxy ratio | 1.02 | 1.13 | 1.24 | 1.35 | 1.49 | 1.64 |
| Processing properties: | | | | | | |
| Hot plate gel time, sec.: | | | | | | |
| 210° C. | 525 | 415 | 390 | 340 | 320 | 315 |
| 180° C. | | 1020 | 925 | 820 | 695 | 680 |
| Mechanical properties[e]: | | | | | | |
| HDT, 264 psi, °C. (ASTM D-648) | 154,160 | 147,151 | 138 | 127,127 | 109,114 | 104,105 |
| R.T. Tensile (ASTM D-638): | | | | | | |
| Strength, MPa | 73 ± 9 | 70 ± 9 | 72 ± 14 | 79 ± 1 | 81 ± 1 | 81 ± 1 |
| Modulus, GPa | 2.32 ± 0.15 | 2.31 ± 0.19 | 2.48 ± 0.11 | 2.52 ± 0.15 | 3.05 ± 0.12 | 3.00 ± 0.30 |
| Elongation, % | 6.1 ± 1.6 | 5.1 ± 1.3 | 5.5 ± 1.8 | 9.0 ± 1.2 | 7.6 ± 0.6 | 6.9 ± 1.8 |

[a] Epon resin 828 mixture contained 100 parts Epon resin 828, 8 parts of styrene[c] and 0.4 part of Lupersol 101[c].
[b] DETDA mixture contained 32 parts of DETDA (Ethyl Corp.) and 8 parts of TMPTMA[c].
[c] All monomers contained 1000 ppm phenothiazine as polymerization inhibitor.
[d] Pennwalt Lucidol brand of 2,5-bis(t-butylperoxy)2,5-dimethylhexane.
[e] Cure cycle = 1 hour at 80° C., followed by 1 hour at 120° C., 1 hour at 150° C., and 4 hours at 175° C.

TABLE 2

CURE OF MONOMER-MODIFIED EPON ® RESIN 828 WITH MIXTURES OF DIETHYLTOLUENEDIAMINE (DETDA) AND BISMARCK BROWN R BASE (BBRB)

| Mixture # | 1 | 2 | 3 | 4 | 5 | 6 | 7 |
|---|---|---|---|---|---|---|---|
| Composition as mixed: | | | | | | | |
| Epon resin 828 mixture, parts[a] | 100 | 100 | 100 | 100 | 100 | 100 | 100 |
| BBRB mixture, parts[b] | 23.4 | 25.6 | 27.7 | 29.9 | 32.1 | 34.2 | 36.4 |
| Composition breakdown: | | | | | | | |
| EPON resin 828, parts | 100 | 100 | 100 | 100 | 100 | 100 | 100 |
| DETDA, parts | 14.6 | 16.0 | 17.3 | 18.6 | 20.0 | 21.3 | 22.7 |
| BBRB[c], parts | 6.3 | 6.8 | 7.4 | 8.0 | 8.6 | 9.1 | 9.7 |
| Styrene[d], parts | 15 | 15 | 15 | 15 | 15 | 15 | 15 |
| TMPTMA[d], parts (trimethylolpropane trimethacrylate) | 12.3 | 13.0 | 13.7 | 14.4 | 15.0 | 15.7 | 16.4 |
| Lupersol 101[e], parts | 0.4 | 0.4 | 0.4 | 0.4 | 0.4 | 0.4 | 0.4 |
| NH/epoxy ratio[f] | 0.735 | 0.803 | 0.871 | 0.939 | 1.006 | 1.074 | 1.142 |
| Processing properties: | | | | | | | |
| Hot plate gel time, sec.: | | | | | | | |
| 210° C. | 340 | | 270 | | 235 | | 230 |
| 180° C. | 885 | | 720 | | 580 | | 530 |
| 150° C. | >1800 | | | | | | 1600 |

TABLE 2-continued
CURE OF MONOMER-MODIFIED EPON ® RESIN 828 WITH MIXTURES OF DIETHYLTOLUENEDIAMINE (DETDA) AND BISMARCK BROWN R BASE (BBRB)

| Mixture # | 1 | 2 | 3 | 4 | 5 | 6 | 7 |
|---|---|---|---|---|---|---|---|
| Mechanical properties[g]: | | | | | | | |
| HDT, 264 psi, °C. (ASTM D-648) | 150,151 | 144,146 | 148,159 | 144,147 | 140,143 | 138,141 | 137,137 |
| R.T. Tensile (ASTM D-638): | | | | | | | |
| Strength, MPa | 73 ± 3 | | 76 ± 3 | 78 ± 5 | 82 ± 2 | 84 ± 5 | 74 ± 17 |
| Modulus, GPa | 2.92 ± 0.07 | | 3.17 ± 0.14 | 3.25 ± 0.11 | 3.25 ± 0.12 | 3.08 ± 0.19 | 3.17 ± 0.21 |
| Elongation, % | 4.2 ± 0.4 | | 4.0 ± 0.3 | 4.2 ± 0.5 | 4.6 ± 0.4 | 5.0 ± 1.1 | 3.8 ± 1.3 |

[a]Epon resin 828 mixture contained 100 parts Epon resin 828, 15 parts styrene[d], 5 parts TMPTMA[d], and 0.4 part Lupersol 101[e].
[b]The BBRB mixture used contained 30 parts BBRB, 70 parts DETDA and 35.2 parts TMPTMA[d]. It had a 25° C. Brookfield viscosity of 8.6 Pa.s (86 poise).
[c]The Bismarck Brown R Base (BBRB) was lot # 1835-9, produced by Passaic Color and Chemical Corporation. Titration yielded an amine equivalent weight of 190, which means an amine hydrogen equivalent weight of 95 if all amine groups are assumed primary.
[d]All monomers contained 1000 ppm phenothiazine as polymerization inhibitor.
[e]Pennwalt Lucidol brand of 2,5-bis(t-butylperoxy)2,5-dimethylhexane.
[f]Calculated on assumption that amine hydrogen equivalent weight of BBRB is 95 (see footnote [c]).
[g]Cure cycle = 1 hour at 80° C. followed by 1 hour at 120° C., 1 hour at 150° C., and 4 hours at 175° C.

What is claimed is:

1. A composition comprising:
   (a) an epoxy resin and
   (b) an effective amount of a curing agent for the epoxy resin, the curing agent comprising an aromatic azopolyamine.

2. The composition of claim 1 in which the aromatic azopolyamine is the reaction product of an arenediazonium salt and an aromatic diamine.

3. The composition of claim 2 in which the arenediazonium salt is an arenebisdiazonium salt.

4. The composition of claim 1 in which the aromatic azopolyamine comprises an amine which can be represented by the structure

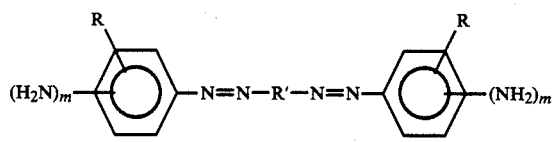

in which each R is selected independently from H and $C_1$–$C_4$ alkyl; R′ is a substituted or unsubstituted aromatic or bisaromatic group; and m is 1 or 2.

5. The composition of claim 4 in which each R is H.

6. The composition of claim 4 in which each R is $CH_3$.

7. The composition of claim 1 in which the aromatic azopolyamine comprises an amine which can be represented by the structure

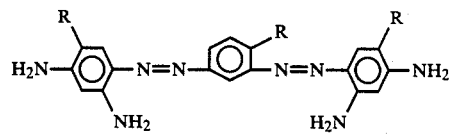

in which each R is selected from H and $CH_3$.

8. The composition of claim 1 which further comprises a co-curing agent.

9. The composition of claim 8 in which the co-curing agent is a non azo group-containing aromatic amine.

10. The composition of claim 9 in which the co-curing agent is selected from the group consisting of 2,4-bis(p-aminobenzyl)aniline, diethyltoluenediamine and methylenedianiline.

11. The composition of claim 1 which further comprises a nonreactive solvent.

12. The composition of claim 8 in which the nonreactive solvent comprises isopropyl alcohol.

13. The composition of claim 1 which further comprises a reactive monomer diluent.

14. The composition of claim 10 in which the reactive diluent comprises trimethylolpropane trimethacrylate.

15. The composition of claim 10 in which the reactive monomer diluent comprises styrene.

16. The composition of claim 1 which further comprises a cure accelerator.

17. The composition of claim 16 in which the cure accelerator is an imidazole compound.

18. The composition of claim 10 which further comprises a fee radical initiator.

19. The composition of claim 15 in which the free radical initiator is a peroxide.

20. The composition of claim 1 which further comprises a fibrous reinforcing material.

21. A prepreg comprising the composition of claim 20.

22. A molded article comprising the composition of claim 1.

* * * * *